United States Patent
Sasanuma et al.

(10) Patent No.: US 8,720,203 B2
(45) Date of Patent: May 13, 2014

(54) CARBON DIOXIDE RECOVERY METHOD AND CARBON-DIOXIDE-RECOVERY-TYPE STEAM POWER GENERATION SYSTEM

(75) Inventors: Takeshi Sasanuma, Yokohama (JP); Nobuo Okita, Ushiku (JP); Takeo Takahashi, Yokohama (JP); Mikio Takayanagi, Tokyo (JP); Takeo Suga, Yokohama (JP); Yuya Murakami, Tokyo (JP); Toshihisa Kiyokuni, Yokohama (JP); Hideo Kitamura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 259 days.

(21) Appl. No.: 13/277,810

(22) Filed: Oct. 20, 2011

(65) Prior Publication Data
US 2012/0096861 A1    Apr. 26, 2012

(30) Foreign Application Priority Data
Oct. 21, 2010    (JP) ................................. 2010-236510

(51) Int. Cl.
*F01K 7/34* (2006.01)
*F01K 13/02* (2006.01)

(52) U.S. Cl.
USPC .................. 60/653; 60/677; 60/679; 423/220

(58) Field of Classification Search
USPC ............ 60/646, 653, 657, 677–679; 110/215, 110/234; 96/236; 423/220
See application file for complete search history.

(56) References Cited

U.S. PATENT DOCUMENTS

| | | | |
|---|---|---|---|
| 5,344,627 A * | 9/1994 | Fujii et al. | 423/220 |
| 5,467,722 A * | 11/1995 | Meratla | 110/345 |
| 6,883,327 B2 * | 4/2005 | Iijima et al. | 60/649 |
| 7,269,956 B2 | 9/2007 | Gericke et al. | |
| 7,328,581 B2 | 2/2008 | Christensen et al. | |
| 7,488,463 B2 * | 2/2009 | Iijima et al. | 423/220 |

(Continued)

FOREIGN PATENT DOCUMENTS

| | | |
|---|---|---|
| CN | 1671463 A | 9/2005 |
| CN | 101235752 A | 8/2008 |

(Continued)

OTHER PUBLICATIONS

Australian Office Action dated Sep. 26, 2012 filed in Australian Counterpart Application No. 2011239264, 3 pages.

(Continued)

*Primary Examiner* — Hoang Nguyen
(74) *Attorney, Agent, or Firm* — Patterson & Sheridan, LLP

(57) ABSTRACT

According to one embodiment, a carbon-dioxide-recovery-type steam power generation system comprises a boiler that generates steam and an exhaust gas, an absorption tower that allows carbon dioxide contained in the exhaust gas to be absorbed in an absorption liquid, a regeneration tower that regenerates discharges a carbon dioxide gas from the absorption liquid, a reboiler that heats the absorption liquid of the regeneration tower, a turbine that is rotationally driven by the steam, a condenser that generates condensate by cooling steam exhausted from the turbine, a compressor that compresses the carbon dioxide gas, and a cooler that cools the carbon dioxide gas, which has been compressed by the compressor, while using a part of the condensate as cooling water. The reboiler is supplied with steam from the turbine and steam generated by the cooling of the carbon dioxide gas at the cooler.

9 Claims, 6 Drawing Sheets

(56) References Cited

U.S. PATENT DOCUMENTS

| | | | |
|---|---|---|---|
| 8,091,361 B1 * | 1/2012 | Lang | 60/654 |
| 8,192,530 B2 | 6/2012 | Handagama et al. | |
| 2005/0166569 A1 | 8/2005 | Christensen et al. | |
| 2005/0235625 A1 | 10/2005 | Gericke et al. | |
| 2007/0256559 A1 * | 11/2007 | Chen et al. | 95/169 |
| 2009/0151566 A1 | 6/2009 | Handagama et al. | |
| 2010/0050637 A1 * | 3/2010 | Yamashita et al. | 60/653 |

FOREIGN PATENT DOCUMENTS

| | | |
|---|---|---|
| CN | 101666248 A | 3/2010 |
| EP | 1473072 A1 | 11/2004 |
| JP | S59219603 A | 12/1984 |
| JP | 05184868 A | 7/1993 |
| JP | 08-257355 | 10/1996 |
| JP | 2004-323339 | 11/2004 |
| JP | 2006506568 A | 2/2006 |
| JP | 2011506081 A | 3/2011 |
| WO | 2007073201 A1 | 6/2007 |
| WO | 2009076328 A2 | 6/2009 |
| WO | 2009076328 A3 | 6/2009 |

OTHER PUBLICATIONS

Chinese Office Action dated Nov. 1, 2013, filed in Chinese counterpart Application No. 201110322362.9, 27 pages (with translation).
Japanese Office Action dated Mar. 4, 2014, filed in Japanese counterpart Application No. 2010-236510, 4 pages (with translation).

* cited by examiner

CARBON DIOXIDE RECOVERY METHOD AND CARBON-DIOXIDE-RECOVERY-TYPE STEAM POWER GENERATION SYSTEM

CROSS REFERENCE TO RELATED APPLICATION

This application is based upon and claims benefit of priority from the Japanese Patent Application No. 2010-236510, filed on Oct. 21, 2010, the entire contents of which are incorporated herein by reference.

FIELD

Embodiments described herein relate generally to a carbon-dioxide-recovery-type steam power generation system and a carbon dioxide recovery method.

BACKGROUND

In a power generation system such as a thermal power plant using a large amount of fossil fuel, an amine absorption method is employed as a method of removing and recovering carbon dioxide that is one of causes of global warming. However, in the amine absorption method, thermal energy obtained from a great amount of steam having low pressure (for example, about 0.3 MPa) is required to regenerate an absorption liquid having absorbed carbon dioxide.

In order to compensate this thermal energy, there is proposed a method of joining condensate, which is branched from a turbine condensate system, to a deaerator after performing heat exchange between the amount of heat of recovered carbon dioxide and heat generated by compressing carbon dioxide to high pressure (for example, about 8 MPa) that is suitable for injecting carbon dioxide into the ground.

However, there has been a problem in that the amount of condensate is not enough to recover the total amount of heat of carbon dioxide. As a result, the amount of condensate flowing in a low-pressure heater is reduced and the amount of gas extracted from a turbine is reduced, so that the amount of heat dumped to a condenser is increased and the effect of a regeneration cycle in the related art is decreased. For this reason, there has been a problem in that the output of the turbine is not particularly increased by the amount of recovered heat.

Further, when recovered carbon dioxide is injected into the ground, it is necessary to compress carbon dioxide to high pressure. However, it was not possible to avoid the large reduction of the output of a power plant in order to secure a power source for this compression.

DETAILED DESCRIPTION

According to one embodiment, a carbon-dioxide-recovery-type steam power generation system comprises a boiler that generates steam through the combustion of fuel and generates an exhaust gas, an absorption tower that is supplied with the exhaust gas from the boiler, and allows carbon dioxide contained in the exhaust gas to be absorbed in an absorption liquid, a regeneration tower that is supplied with the absorption liquid having absorbed carbon dioxide from the absorption tower, discharges a carbon dioxide gas from the absorption liquid, and discharges the carbon dioxide gas, a reboiler that heats the absorption liquid discharged from the regeneration tower and supplies generated steam to the regeneration tower, a turbine that is supplied with steam from the boiler and is rotationally driven, a condenser that generates condensate by cooling steam exhausted from the turbine, a condensate pump that sends the condensate to a line, a water supply pump that is provided on the line and supplies water to the boiler, a compressor that compresses the carbon dioxide gas, and a cooler that is supplied with a part of the condensate and cools the carbon dioxide gas, which has been compressed by the compressor, while using the condensate as cooling water. The reboiler is supplied with steam that is exhausted from the turbine and steam that is generated by the cooling of the carbon dioxide gas at the cooler.

Embodiments will now be explained with reference to the accompanying drawings.

(First Embodiment)

Figure 1:
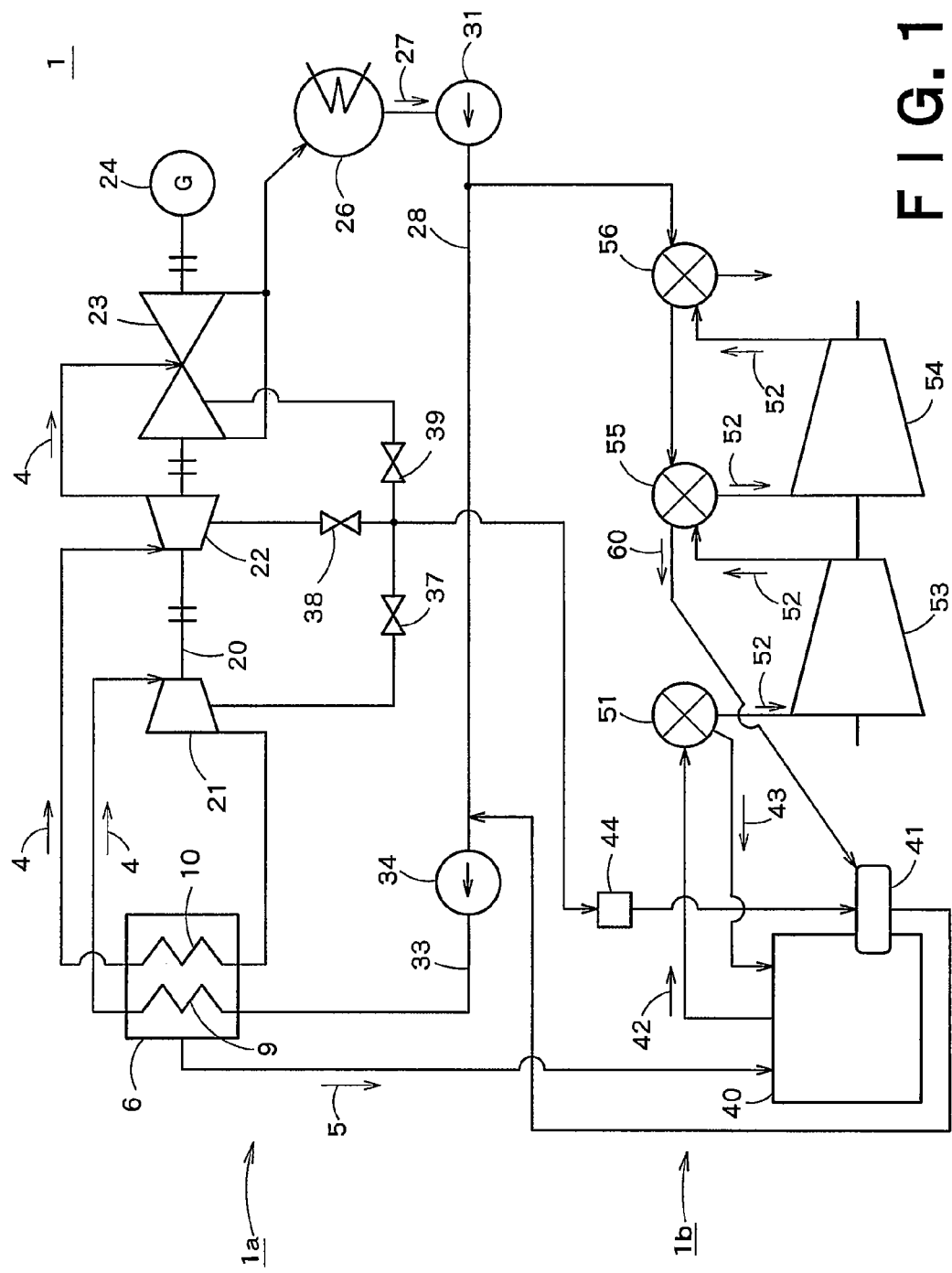
FIG. 1 is a view showing the schematic structure of a carbon-dioxide-recovery-type steam power generation system according to a first embodiment.

FIG. 1 shows an entire structure of a carbon-dioxide-recovery-type steam power generation system according to a first embodiment. A carbon-dioxide-recovery-type steam power generation system 1 includes a steam power generation plant 1a and a carbon dioxide recovery plant 1b. The steam power generation plant 1a generates turbine steam 4 through the combustion of fuel and generates power by rotationally driving a turbine. The carbon dioxide recovery plant 1b recovers carbon dioxide from an exhaust gas 5, which is generated in a boiler 6, by using an absorption liquid that absorbs carbon dioxide contained in the exhaust gas 5.

The boiler 6 is supplied with fuel and air for combustion and fuel is combusted in a furnace, so that the turbine steam 4 and the exhaust gas 5 are generated. The boiler 6 includes a superheater 9 and a reheater 10. The superheater 9 generates main steam by heating the turbine steam 4 through the combustion in the furnace. The reheater 10 is provided adjacent to the superheater 9, and generates reheat steam by reheating the turbine steam 4 that is supplied from the superheater 9 through a high-pressure steam turbine 21 to be described below.

The steam power generation plant 1a includes a high-pressure steam turbine (high-pressure turbine) 21 and an intermediate-pressure steam turbine (intermediate-pressure turbine) 22. The high-pressure turbine 21 is rotationally driven by the turbine steam 4 (main steam) that is supplied from the superheater 9 of the boiler 6. The intermediate-pressure turbine 22 is connected to the high-pressure turbine 21 by a turbine shaft 20, and is rotationally driven by the turbine steam 4 (reheat steam) that is supplied from the high-pressure turbine 21 through the reheater 10 of the boiler 6.

Further, a low-pressure steam turbine (low-pressure turbine) 23 is connected to the intermediate-pressure turbine 22 by the turbine shaft 20. The low-pressure turbine 23 is adapted to be rotationally driven by the turbine steam 4 supplied from the intermediate-pressure turbine 22 (exhaust steam (intermediate-pressure exhaust steam) discharged from the intermediate-pressure turbine 22). Furthermore, a generator 24, which generates power by the rotation of the turbine shaft 20, is connected to the turbine shaft 20.

Meanwhile, in this embodiment, the rotating shafts of the high-pressure turbine 21, the intermediate-pressure turbine 22, the low-pressure turbine 23, and the generator 24 are connected to each other so as to form one turbine shaft 20. However, the embodiment is not limited to this structure. The steam power generation plant 1a may include two or more turbine shafts each which includes at least one steam turbine and a plurality of generators connected to the respective turbine shafts.

A condenser 26, which generates condensate 27 by cooling and condensing the turbine steam discharged from the low-pressure turbine 23 (exhaust steam (low-pressure exhaust steam) discharged from the low-pressure turbine 23) is provided below the low-pressure turbine 23. The condensate 27 discharged from the condenser 26 is sent to the downstream side of a line 28 by a condensate pump 31, and is sent to the boiler 6 through a line 33 by a water supply pump 34.

As shown in FIG. 1, the carbon dioxide recovery plant 1b is provided with a carbon dioxide separation recovery apparatus 40 that is supplied with the exhaust gas 5 from the boiler 6 and separates and recovers carbon dioxide contained in the exhaust gas 5. The carbon dioxide separation recovery apparatus 40 includes an absorption tower (not shown) and a regeneration tower (not shown). The absorption tower allows carbon dioxide contained in the exhaust gas 5 to be absorbed in the carbon dioxide-absorption liquid. The regeneration tower is supplied with the absorption liquid (rich liquid) having absorbed carbon dioxide from the absorption tower, discharges a carbon dioxide gas 42 containing water vapor by allowing a carbon dioxide gas to be discharged from the rich liquid, and regenerates the absorption liquid. The absorption liquid, which is regenerated in the regeneration tower, is supplied to the absorption tower.

An amine compound aqueous solution, which is obtained by dissolving an amine compound in water, may be used as the absorption liquid that is used to absorb carbon dioxide.

The regeneration tower is provided with a reboiler 41. The reboiler 41 allows the temperature of a lean liquid to rise and generates steam by heating a part of the lean liquid (a regenerated absorption liquid of which carbon dioxide content is low) that is stored in the regeneration tower. Then, the reboiler 41 supplies the steam to the regeneration tower. When the lean liquid is heated in the reboiler 41, a carbon dioxide gas is discharged from the lean liquid and supplied to the regeneration tower together with the steam of the absorption liquid. The steam of the absorption liquid ascends in the regeneration tower, and heats the rich liquid. Accordingly, a carbon dioxide gas is discharged from the rich liquid. A heat source of the reboiler 41 will be described below.

The carbon dioxide gas 42, which contains water vapor and is discharged from the top portion of the regeneration tower, is supplied to a $CO_2$ condenser (condenser) 51. Water vapor 43, which is condensed by the $CO_2$ condenser 51, returns to the regeneration tower of the carbon dioxide separation recovery apparatus 40.

Carbon dioxide 52 of which the purity has been increased by the $CO_2$ condenser 51 is compressed to a high-pressure state (for example, about 8 MPa), which is suitable for injecting carbon dioxide into the ground, by compressors 53 and 54. After being cooled by an intermediate cooler 55, the carbon dioxide 52, which has been compressed by the compressor 53, is compressed by the compressor 54. Further, the carbon dioxide 52, which has been compressed by the compressor 54, is cooled by an outlet cooler 56. Since the intermediate cooler 55 and the outlet cooler 56 are provided as described above, it is possible to improve compression efficiency and to recover heat from the carbon dioxide 52 of which the temperature has been raised by compression.

Next, the heat source of the reboiler 41 will be described. As shown in FIG. 1, the temperature of the steam, which is extracted or exhausted from the high-pressure turbine 21, the intermediate-pressure turbine 22, or the low-pressure turbine 23, is lowered to temperature, which is suitable to raise the temperature of the carbon dioxide-absorption liquid, by a desuperheater 44, and the steam of which the temperature has been lowered is supplied to the reboiler 41. It is possible to switch steam, which is to be used, to any one of the steam extracted or exhausted from the high-pressure turbine 21, the steam extracted or exhausted from the intermediate-pressure turbine 22, and the steam extracted or exhausted from the low-pressure turbine 23 by valves 37 to 39.

Moreover, cooling water (condensate 27), which is branched from the line 28 on the downstream side of the condensate pump 31, is changed into steam 60 by recovering heat of the carbon dioxide 52 at the outlet cooler 56 and the intermediate cooler 55, and the steam 60 is supplied to the reboiler 41. For example, the carbon dioxide 52, which is compressed by the compressor 53 and has a temperature of 200° C. to 250° C., is cooled to a temperature of about 40° C. by the intermediate cooler 55. The carbon dioxide 52, which is compressed by the compressor 54 and has a temperature of about 250° C., is cooled to a temperature of about 40° C. by the outlet cooler 56. The cooling water (condensate 27) is changed into steam 60, which has a temperature of 120° C. to 130° C., by recovering heat of the carbon dioxide 52 at the outlet cooler 56 and the intermediate cooler 55.

Accordingly, the reboiler 41 uses steam, which is supplied from the steam power generation plant is (the high-pressure turbine 21, the intermediate-pressure turbine 22, or the low-pressure turbine 23), and steam 60, which is generated by allowing a part of the condensate 27 to recover heat generated by the compression of the carbon dioxide 52, as a heat source.

Steam discharged from the reboiler 41 is joined to the line 28 as drainage at an appropriate position between the condensate pump 31 and the water supply pump 34.

As described above, in this embodiment, the heat of the carbon dioxide 52 is recovered by a part of the condensate 27 at the outlet cooler 56 and the intermediate cooler 55 and the generated steam 60 is used as the heat source of the reboiler 41. Accordingly, the carbon-dioxide-recovery-type steam power generation system 1 can efficiently recover thermal energy that is generated while the carbon dioxide 52 is injected into the ground, and can achieve high thermal efficiency.

(Second Embodiment)

Figure 2:
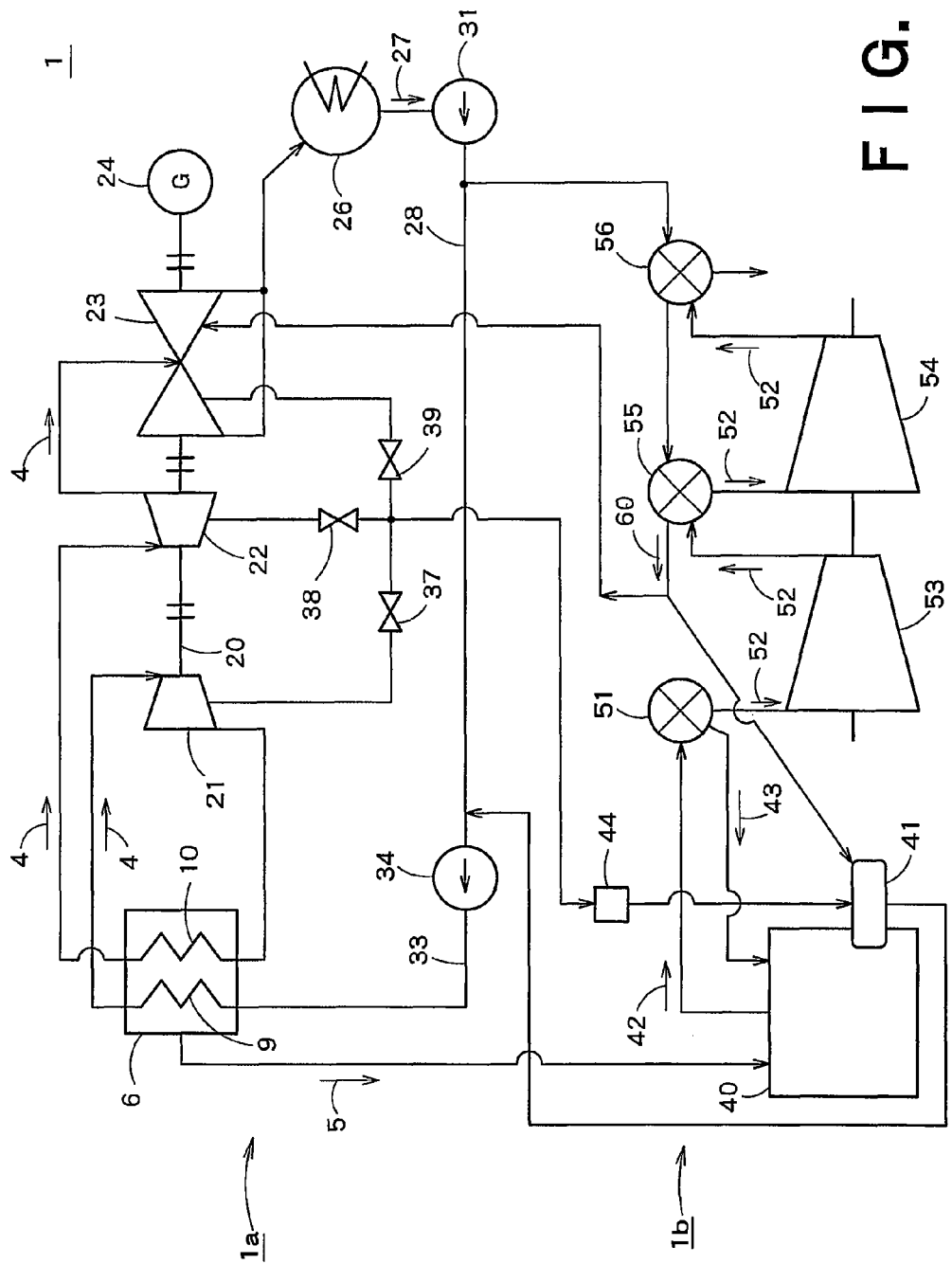
FIG. 2 is a view showing the schematic structure of a carbon-dioxide-recovery-type steam power generation system according to a second embodiment.

FIG. 2 shows a schematic structure of a carbon-dioxide-recovery-type steam power generation system according to a second embodiment. This embodiment is different from the first embodiment shown in FIG. 1 in that a part of steam 60 is supplied to a low-pressure turbine 23. In FIG. 2, the same portions as the portions of the first embodiment shown in FIG. 1 are denoted by the same reference numerals. The description thereof will be omitted.

Steam, which is supplied to the low-pressure turbine 23, of steam 60, which is generated by allowing cooling water (condensate 27) to recover heat of carbon dioxide 52 at an outlet cooler 56 and an intermediate cooler 55, is used as steam for driving the low-pressure turbine 23.

Since thermal energy, which is generated while the carbon dioxide 52 is injected into the ground, is used as energy for driving the low-pressure turbine 23 in this embodiment as described above, it is possible to increase the output of the steam power generation plant 1a. Accordingly, the carbon-dioxide-recovery-type steam power generation system 1 can efficiently recover thermal energy that is generated while the carbon dioxide 52 is injected into the ground, and can achieve high thermal efficiency.

(Third Embodiment)

Figure 3:
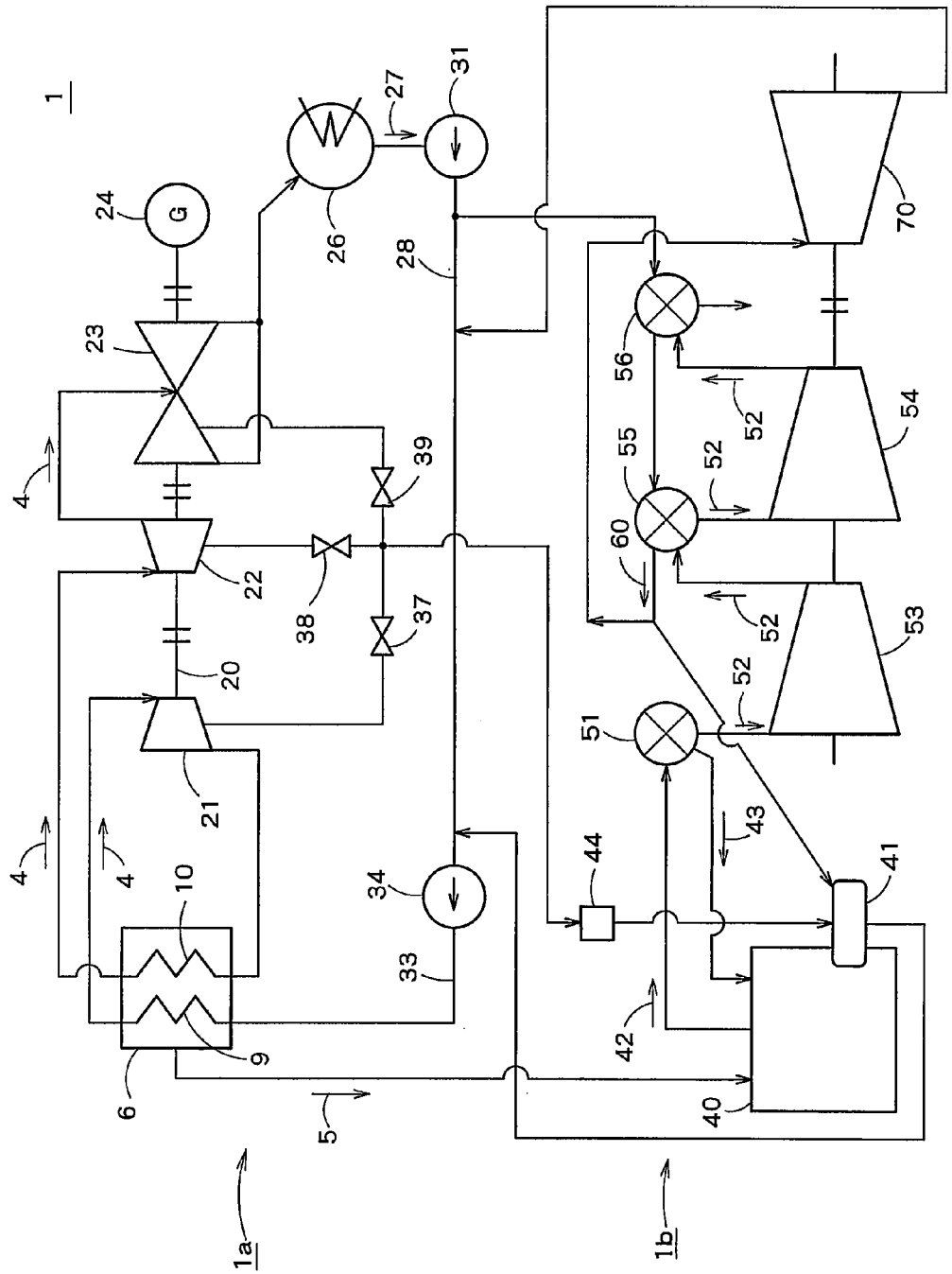
FIG. 3 is a view showing the schematic structure of a carbon-dioxide-recovery-type steam power generation system according to a third embodiment.

FIG. 3 shows a schematic structure of a carbon-dioxide-recovery-type steam power generation system according to a third embodiment. This embodiment is different from the first embodiment shown in FIG. 1 in that a part of steam 60 is supplied to a turbine 70 driving compressors 53 and 54. In FIG. 3, the same portions as the portions of the first embodiment shown in FIG. 1 are denoted by the same reference numerals. The description thereof will be omitted.

A turbine 70 is coaxially connected to the compressors 53 and 54, and drives the compressors 53 and 54.

Steam, which is supplied to the turbine 70, of steam 60, which is generated by allowing cooling water (condensate 27) to recover heat of carbon dioxide 52 at an outlet cooler 56 and an intermediate cooler 55, is used as steam for driving the turbine 70. Steam discharged from the turbine 70 is joined to a line 28 at an appropriate position between a condensate pump 31 and a water supply pump 34.

As described above, in this embodiment, thermal energy, which is generated while the carbon dioxide 52 is injected into the ground, is used as energy for driving the turbine 70 that drives the compressors 53 and 54. Accordingly, it is possible to prevent the reduction of the output of the steam power generation plant 1a by a power source for the compression of carbon dioxide. Therefore, the carbon-dioxide-recovery-type steam power generation system 1 can efficiently recover thermal energy that is generated while the carbon dioxide 52 is injected into the ground, and can achieve high thermal efficiency.

In the first to third embodiments, it may be possible to adjust the flow rate of the condensate 27, which is branched from the line 28 and supplied to the outlet cooler 56 and the intermediate cooler 55, on the basis of the temperature of steam required in the reboiler 41.

Figure 4:
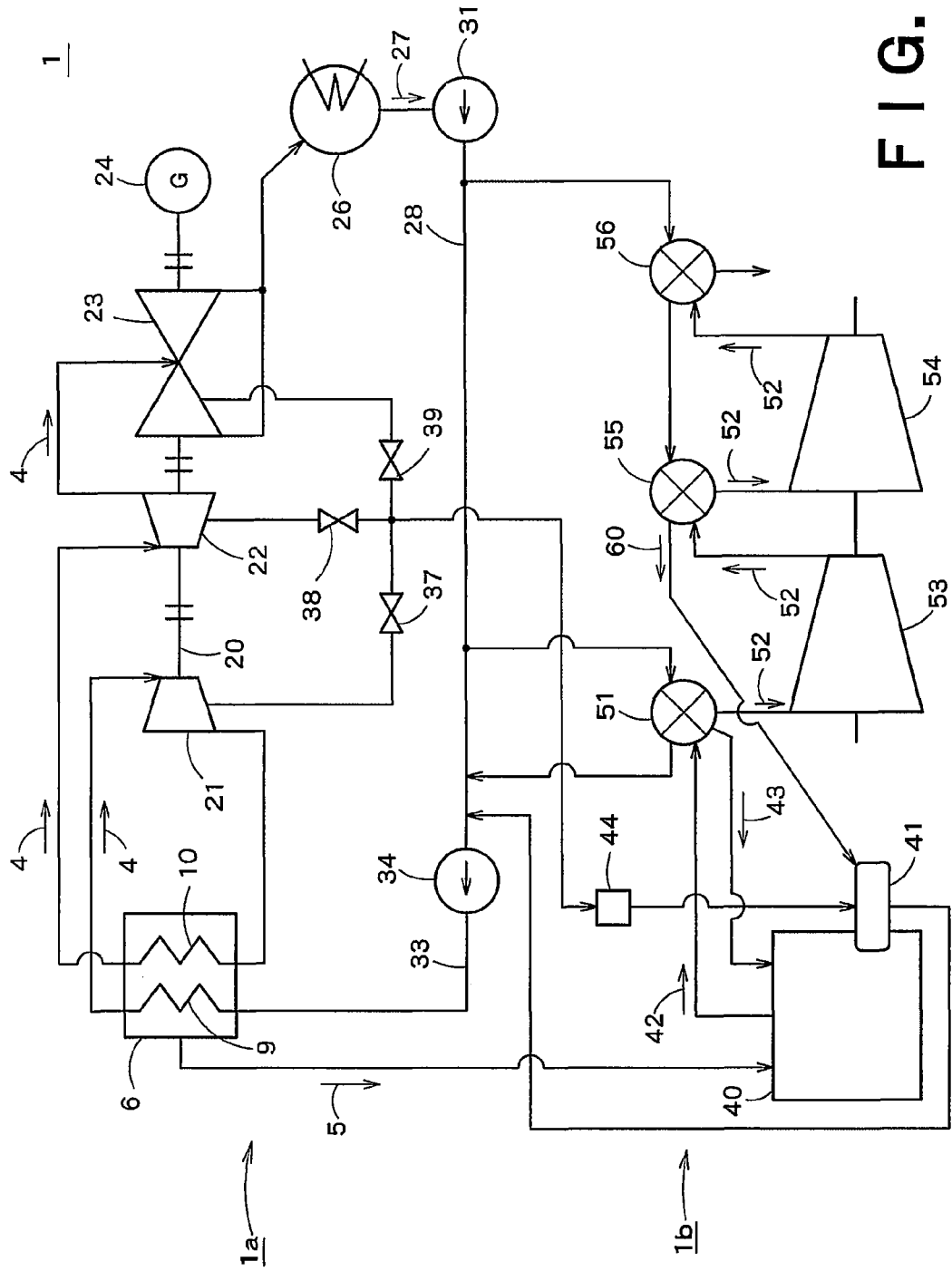
FIG. 4 is a view showing the schematic structure of a carbon-dioxide-recovery-type steam power generation system according to a modification.
Figure 5:
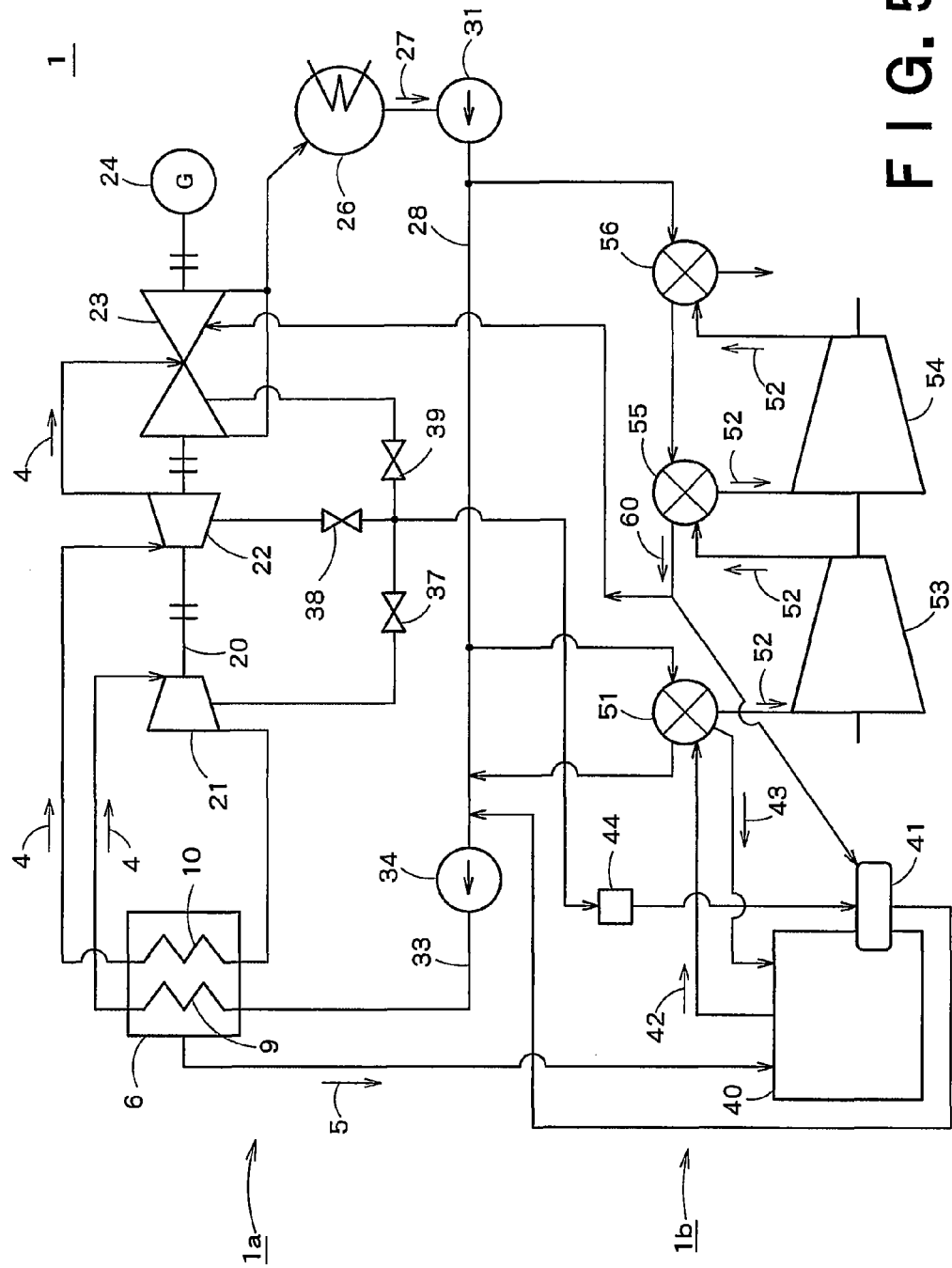
FIG. 5 is a view showing the schematic structure of a carbon-dioxide-recovery-type steam power generation system according to a modification.
Figure 6:
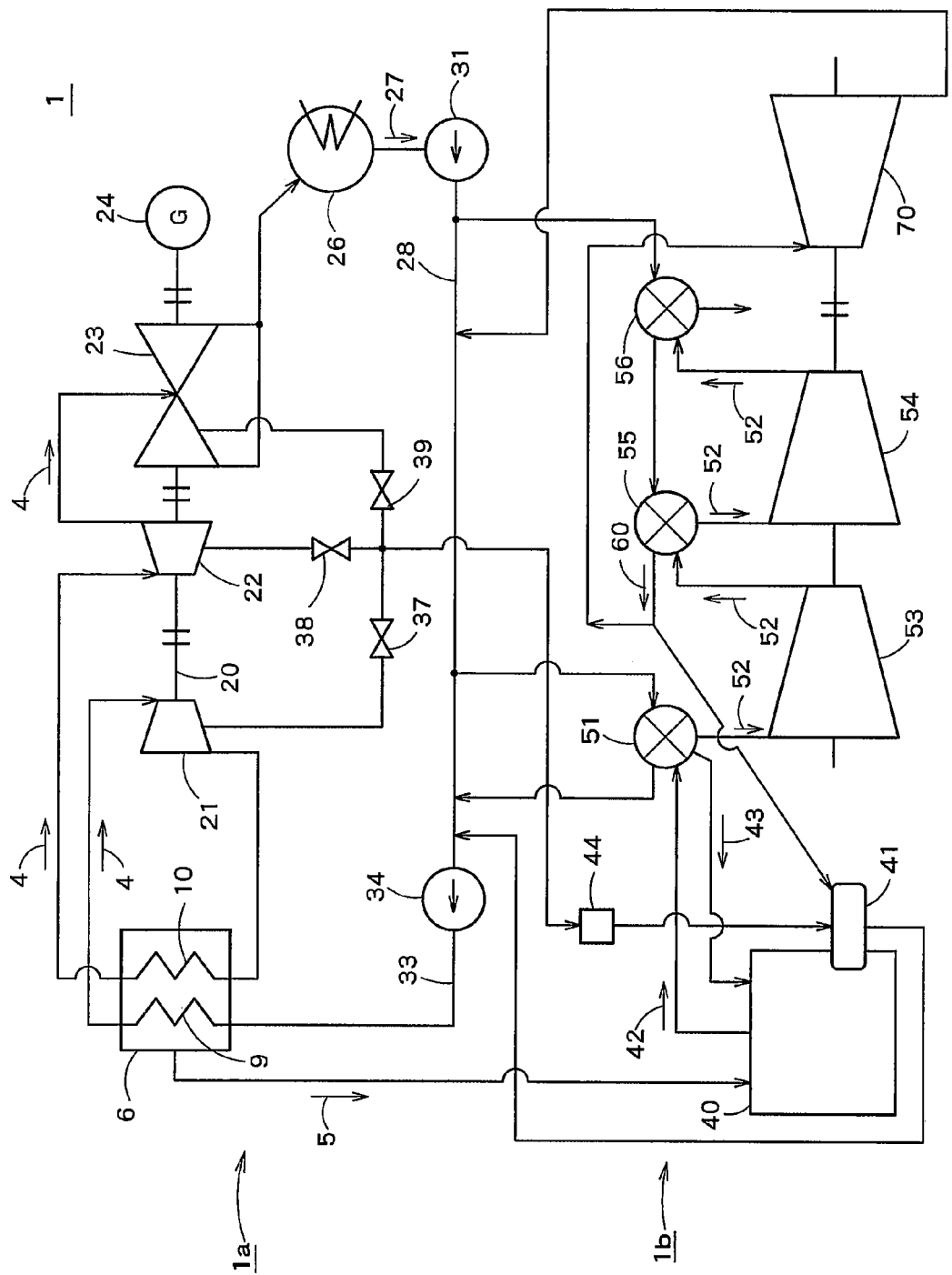
FIG. 6 is a view showing the schematic structure of a carbon-dioxide-recovery-type steam power generation system according to a modification.

A structure where a part of the condensate 27 branched from the line 28 recovers the heat of the carbon dioxide 52 at the outlet cooler 56 and the intermediate cooler 55 has been described in the first to third embodiments. However, unlike this, a part of the condensate 27 branched from the line 28 may recover the heat of the carbon dioxide gas 42 containing water vapor at the $CO_2$ condenser 51. The condensate 27, which has recovered the heat of the carbon dioxide gas at the $CO_2$ condenser 51, returns to the line 28 at an appropriate position between the condensate pump 31 and the water supply pump 34. Examples where this structure is applied to the carbon-dioxide-recovery-type steam power generation systems 1 shown in FIGS. 1 to 3 are shown in FIGS. 4 to 6. Since the carbon dioxide gas 42 containing water vapor supplied to the $CO_2$ condenser 51 has a temperature of about 110° C., it is possible to further improve the thermal efficiency of the carbon-dioxide-recovery-type steam power generation system by recovering the heat of the carbon dioxide gas 42.

In each of the above-mentioned embodiments, two compressors for compressing carbon dioxide and two coolers for cooling the compressed carbon dioxide have been provided. However, one compressor and one cooler may be provided, or three or more compressors and three or more coolers may be provided.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A carbon-dioxide-recovery-type steam power generation system comprising:
    a boiler that generates steam through the combustion of fuel and generates an exhaust gas;
    an absorption tower that is supplied with the exhaust gas from the boiler, and allows carbon dioxide contained in the exhaust gas to be absorbed in an absorption liquid;
    a regeneration tower that is supplied with the absorption liquid having absorbed carbon dioxide from the absorption tower, discharges a carbon dioxide gas from the absorption liquid, and discharges the carbon dioxide gas;
    a reboiler that heats the absorption liquid discharged from the regeneration tower and supplies generated steam to the regeneration tower;
    a turbine that is supplied with steam from the boiler and is rotationally driven;
    a condenser that generates condensate by cooling steam exhausted from the turbine;
    a condensate pump that sends the condensate to a line;
    a water supply pump that is provided on the line and supplies water to the boiler;
    a compressor that compresses the carbon dioxide gas; and
    a cooler that is supplied with a part of the condensate and cools the carbon dioxide gas, which has been compressed by the compressor, while using the condensate as cooling water,
    wherein the reboiler is supplied with steam that is exhausted from the turbine and steam that is generated by the cooling of the carbon dioxide gas at the cooler.

2. The carbon-dioxide-recovery-type steam power generation system according to claim 1,
    wherein the boiler includes a superheater that generates main steam and a reheater that generates reheat steam,
    the turbine includes a high-pressure turbine that is supplied with the main steam and rotationally driven, an intermediate-pressure turbine that is supplied with the reheat steam and rotationally driven, and a low-pressure turbine that is supplied with steam exhausted from the intermediate-pressure turbine and rotationally driven, and
    the temperature of the steam, which is exhausted from the high-pressure turbine, the intermediate-pressure turbine, or the low-pressure turbine, is lowered and the steam of which the temperature has been lowered is supplied to the reboiler.

3. The carbon-dioxide-recovery-type steam power generation system according to claim 2,
    wherein a part of the steam, which is generated by the cooling of the carbon dioxide gas at the cooler, is supplied to the low-pressure turbine.

4. The carbon-dioxide-recovery-type steam power generation system according to claim 1, further comprising:
a drive turbine that drives the compressor,
wherein a part of the steam, which is generated by the cooling of the carbon dioxide gas at the cooler, is supplied to the drive turbine.

5. The carbon-dioxide-recovery-type steam power generation system according to claim 1, further comprising:
a second compressor that compresses the carbon dioxide gas cooled by the cooler; and
a second cooler that is supplied with a part of the condensate and cools the carbon dioxide gas, which has been compressed by the second compressor, while using the condensate as cooling water,
wherein the steam, which is generated by the cooling of the carbon dioxide gas at the cooler, is supplied to the reboiler after a part of the condensate cools the carbon dioxide gas at the second cooler.

6. The carbon-dioxide-recovery-type steam power generation system according to claim 1, further comprising:
wherein steam discharged from the reboiler is joined to the condensate between the condensate pump and the water supply pump.

7. A carbon dioxide recovery method comprising:
generating steam, which drives a turbine, and generating an exhaust gas by a boiler;
allowing carbon dioxide contained in the exhaust gas discharged from the boiler to be absorbed in an absorption liquid in an absorption tower;
discharging a carbon dioxide gas from the absorption liquid having absorbed carbon dioxide in a regeneration tower and discharging the carbon dioxide gas;
heating the absorption liquid discharged from the regeneration tower and supplying generated steam to the regeneration tower by a reboiler;
lowering the temperature of steam exhausted from the turbine and supplying the steam of which the temperature has been lowered to the reboiler;
generating condensate by cooling the steam, which is exhausted from the turbine, by a condenser;
compressing the carbon dioxide gas by a compressor;
cooling the compressed carbon dioxide gas by a cooler while the cooler uses a part of the condensate as cooling water; and
supplying steam, which is generated by the cooling of the carbon dioxide gas at the cooler, to the reboiler.

8. The carbon dioxide recovery method according to claim 7,
wherein a part of the steam, which is generated by the cooling of the carbon dioxide gas at the cooler, is supplied to the turbine.

9. The carbon dioxide recovery method according to claim 7,
wherein a part of the steam, which is generated by the cooling of the carbon dioxide gas at the cooler, is supplied to a drive turbine that drives the compressor.

* * * * *